(12) United States Patent  
Yamazaki et al.

(10) Patent No.: US 10,970,802 B2  
(45) Date of Patent: Apr. 6, 2021

(54) IMAGING DEVICE AND IMAGING METHOD SELECTING A PIXEL HAVING A LOWEST BRIGHTNESS

(71) Applicant: FUJITSU FRONTECH LIMITED, Inagi (JP)

(72) Inventors: Kozo Yamazaki, Inagi (JP); Isao Iwaguchi, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 224 days.

(21) Appl. No.: 16/052,019

(22) Filed: Aug. 1, 2018

(65) Prior Publication Data

US 2018/0336655 A1 Nov. 22, 2018

Related U.S. Application Data

(63) Continuation of application No. PCT/JP2016/056095, filed on Feb. 29, 2016.

(51) Int. Cl.
*G06T 1/00* (2006.01)
*G06F 21/32* (2013.01)
(Continued)

(52) U.S. Cl.
CPC .............. *G06T 1/0007* (2013.01); *G01J 4/04* (2013.01); *G02B 5/201* (2013.01); *G02B 5/3025* (2013.01);
(Continued)

(58) Field of Classification Search
CPC ................ G02B 5/3025; G02B 27/281; G02B 5/30–3091; G02B 5/201; G02B 5/3058;
(Continued)

(56) References Cited

U.S. PATENT DOCUMENTS 9,645,074 B2 5/2017 Kanamori  
10,848,727 B2 * 11/2020 Kondo .................. H04N 9/735  
(Continued)

FOREIGN PATENT DOCUMENTS

JP 11-41514 2/1999  
JP 2012-173916 9/2012  
(Continued)

OTHER PUBLICATIONS

Japanese Office Action dated Apr. 16, 2019 in corresponding Japanese Patent Application No. 2018-502875 (2 pages).  
International Search Report dated May 17, 2016 in corresponding International Patent Application No. PCT/JP2016/056095.  
Written Opinion of the International Searching Authority dated May 17, 2016 in corresponding International Patent Application No. PCT/JP2016/056095.

*Primary Examiner* — Chiawei Chen  
(74) *Attorney, Agent, or Firm* — Staas & Halsey LLP

(57) ABSTRACT

An imaging device includes: an image sensor that images an object to be imaged through polarizing plates arranged to have a different polarization direction for each pixel in a pixel group that includes a plurality of pixels corresponding to each of points of the object to be imaged; a pixel selecting unit that selects a pixel having a lowest brightness for each of the pixel group corresponding to each of the points; and an image output unit that outputs a captured image of the object to be imaged that is generated from pixels selected by the pixel selecting unit.

4 Claims, 11 Drawing Sheets

(51) Int. Cl.
  *H04N 5/235* (2006.01)
  *H04N 5/232* (2006.01)
  *G02B 5/20* (2006.01)
  *H04N 5/225* (2006.01)
  *G02B 5/30* (2006.01)
  *G01J 4/04* (2006.01)
  *H04N 5/238* (2006.01)
  *H04N 5/369* (2011.01)
  *H04N 9/04* (2006.01)

(52) U.S. Cl.
  CPC ........... *G02B 5/3058* (2013.01); *G06F 21/32* (2013.01); *H04N 5/2254* (2013.01); *H04N 5/2256* (2013.01); *H04N 5/232* (2013.01); *H04N 5/238* (2013.01); *H04N 5/2351* (2013.01); *H04N 5/2354* (2013.01); *H04N 5/23229* (2013.01); *H04N 5/369* (2013.01); *H04N 9/045* (2013.01)

(58) Field of Classification Search
  CPC .. H04N 5/238; H04N 5/23229; H04N 5/2353; H04N 5/2351; H04N 5/2256; H04N 5/2254; H04N 5/2354; H04N 5/232; H04N 5/369; H04N 9/045; G03B 11/00; G03B 17/12; G06K 2009/00932; G06K 9/00006; G06T 1/0007; G06F 21/32; G01J 4/04; G01J 2003/2826; G01J 3/0224; G01J 3/2803; G01J 3/2823; G01J 3/513
  See application file for complete search history.

(56) References Cited

U.S. PATENT DOCUMENTS

| | | | |
|---|---|---|---|
| 2007/0222781 A1* | 9/2007 | Kondo | G06T 15/506 345/426 |
| 2009/0279807 A1 | 11/2009 | Kanamorl et al. | |
| 2012/0230551 A1* | 9/2012 | Hama | G06K 9/036 382/115 |
| 2014/0055664 A1 | 2/2014 | Yamagata et al. | |
| 2015/0212294 A1* | 7/2015 | Imamura | H04N 5/3696 348/345 |
| 2015/0219552 A1* | 8/2015 | Kanamori | G01N 21/21 356/369 |
| 2015/0235375 A1* | 8/2015 | Imagawa | G06T 5/005 382/164 |
| 2015/0256733 A1* | 9/2015 | Kanamori | G02F 1/0136 348/234 |
| 2017/0075050 A1 | 3/2017 | Yamagata et al. | |
| 2017/0243079 A1* | 8/2017 | Hiriyannaiah | G02B 27/281 |
| 2017/0316266 A1* | 11/2017 | Kawabata | G06K 9/00617 |
| 2019/0273856 A1* | 9/2019 | Hirasawa | H04N 5/225 |

FOREIGN PATENT DOCUMENTS

| | | |
|---|---|---|
| JP | 2014-78857 | 5/2014 |
| JP | 2015-164518 | 9/2015 |
| WO | WO 2008/099589 A1 | 8/2008 |
| WO | WO 2013/114888 A1 | 8/2013 |

\* cited by examiner

DIFFUSE REFLECTION AND
REGULAR REFLECTION

SELF-ILLUMINATION ON

SELF-ILLUMINATION OFF

DIFFERENCE IMAGE

IMAGING DEVICE AND IMAGING METHOD SELECTING A PIXEL HAVING A LOWEST BRIGHTNESS

CROSS-REFERENCE TO RELATED APPLICATION

This application is a continuation application of International Application PCT/JP2016/056095, filed on Feb. 29, 2016 and designating the U.S., the entire contents of which are incorporated herein by reference.

FIELD

The present invention relates to an imaging device and an imaging method.

BACKGROUND

Biometric authentication has become widespread recently. The biometric authentication is used to verify whether an operator of a computer or the like is a proper operator, for example, to authenticate an operator of a cash dispenser at a store. In this case, an imaging device images, for example, palm veins of an individual. When the vein pattern based on the image obtained by the imaging device matches with a vein pattern that has been registered in advance, the individual is verified. The cash dispenser accepts operations of only operators verified by the biometric authentication.

Imaging devices for various purposes including biometric authentication systems emit infrared lights to irradiate a palm held toward an imaging direction of the imaging device to capture an image. A part of the infrared lights is reflected on a surface of the palm, but a part thereof passes through the skin and is absorbed by hemoglobin of veins inside the hand. Therefore, by imaging with an infrared-light sensitive image sensor, a vein pattern inside a palm can be acquired in addition to surface information of the palm.

For example, such a imaging device has a self-illuminating device that emits an infrared light to irradiate a palm through a ring-shaped light guide, and acquire a palm image by an imaging system constituted of a lens and an image sensor. The acquired palm image includes a background image such as of a ceiling and a wall, and this can cause a disadvantageous influence on cutting a palm out of a whole image or signal extraction of a vein pattern in an image processing stage depending on conditions.

Therefore, in an actual situation, a method in which images are taken under two conditions of turning on and off the self-illuminating device, and a difference image thereof is used as a palm image is applied. The respective images taken when the self-illuminating device is on and off include the same background, and the background is canceled in the difference image, thereby acquiring a palm image only.

Ambient light, such as sunlight and room light, not only illuminates a background, but also illuminates a palm. Also the illumination by such ambient light or external light on a palm can cause disadvantageous influence on signal extraction of a vein pattern, but is canceled by the difference image, and an image that is illuminated only by the self-illuminating device can be obtained (For example, refer to Patent Document 1).

Patent Document 1: Japanese Laid-open Patent Publication No. 2014-078857

However, in the above technique, external-light-bearing capacity is limited, and when external light is strong like outside, there are problems as explained below.

Because it is a precondition that the brightness at a palm portion of the respective images of when the self-illuminating device is on and off are not saturated, to obtain an accurate difference image, if the external light becomes intense, the exposure when taking images with the self-illuminating device turned on or off is to be decreased. This results in a decreased difference between the respective images taken with the self-illuminating device turned on or off, and it thus becomes difficult to extract a vein pattern accurately. Therefore, an intensity limit is set for external light as a use environment, there is a disadvantage that some measures are necessary to be taken such as using an appropriate cover to make an artificial shade when used outside.

When the external light intensity is high, using only external light for illumination can be considered as another option, but a locally high brightness region (halation, etc.) can occur depending on an incident angle of the external light to a palm, and it can cause a disadvantageous influence on signal extraction of a vein pattern. Therefore, there is a problem that accurate extraction of a vein pattern becomes difficult.

SUMMARY

According to an aspect of the embodiments, an imaging device includes: an image sensor that images an object to be imaged through polarizing plates arranged to have a different polarization direction for each pixel in a pixel group that includes a plurality of pixels corresponding to each of points of the object to be imaged; a pixel selecting unit that selects a pixel having a lowest brightness for each of the pixel group corresponding to each of the points; and an image output unit that outputs a captured image of the object to be imaged that is generated from pixels selected by the pixel selecting unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments according to the present application are explained below, referring to the accompanying drawings. Following embodiments explain an imaging device that is applied to a vein authentication apparatus to authenticate a person based on characteristics of veins of the person as an example, but are not intended to limit the disclosed technique. The disclosed technique is applicable to most imaging devices that acquire, for example, biometric information of a subject from a difference image. The respective embodiments can be combined within a scope of not causing a contradiction. Furthermore, like reference symbols are assigned to like parts throughout the embodiments, and explanation of components and processing that have already been explained is omitted.

First Embodiment (Imaging Device According to First Embodiment)

Figure 1:
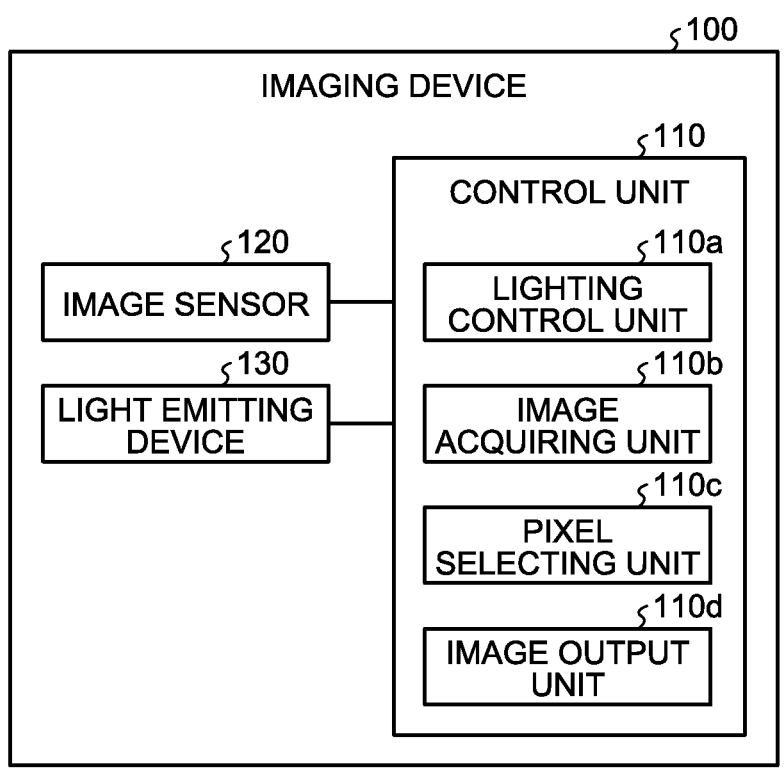
FIG. 1 is a block diagram illustrating one example of an imaging device according to a first embodiment.
Figure 2A:
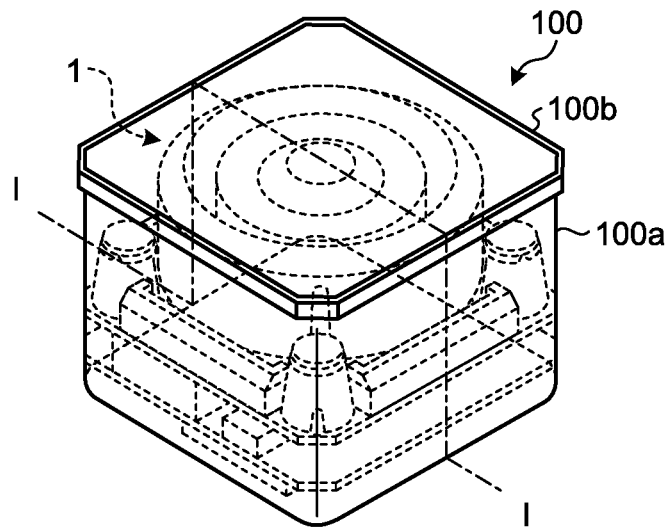
FIG. 2A is a perspective view illustrating one example of the imaging device according to the first embodiment.
Figure 2B:
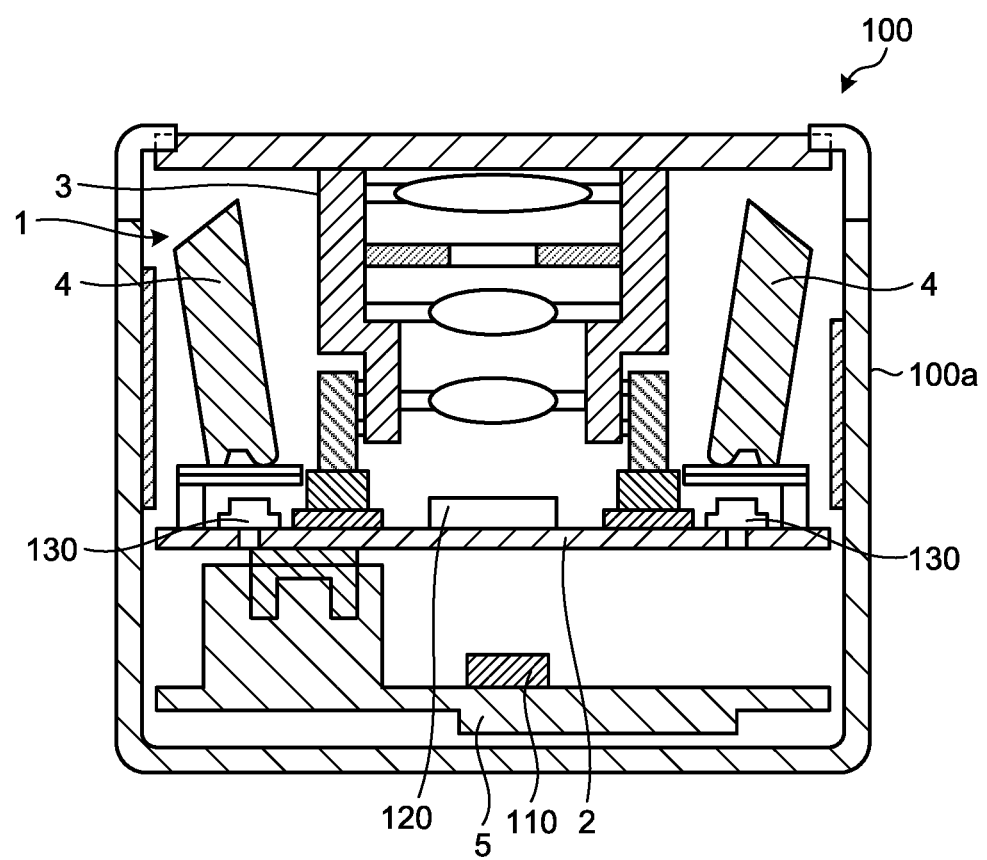
FIG. 2B is a cross section taken along line I-I illustrating one example of the imaging device according to the first embodiment.

In the following, an imaging device according to a first embodiment is explained, referring to FIG. 1 to FIG. 5B. FIG. 1 is a block diagram illustrating one example of an imaging device according to the first embodiment. FIG. 2A is a perspective view illustrating one example of the imaging device according to the first embodiment. FIG. 2B is a cross section taken along line I-I illustrating one example of the imaging device according to the first embodiment.

As illustrated in FIG. 1, an imaging device 100 according to the first embodiment includes a control unit 110 that is a processing device such as a microcomputer, an image sensor 120, and a light emitting device 130. As illustrated in FIG. 2A, in the imaging device 100, an imaging unit 1 is housed in a casing 100a, and is covered by a cover 100b having infrared transparency. The imaging device 100 images a palm that is held over the cover 100b.

As illustrated in FIG. 2B in a cross section taken along I-I of FIG. 2A, the imaging unit 1 of the imaging device 100 has the image sensor 120, the light emitting device 130, a lens unit 3, and a light guide 4 on a substrate 2, and has the control unit 110 on a control substrate 5. Light emitted by the light emitting device 130 is projected upward through the light guide 4 as illumination light from the cover 100b. This light illuminates a palm held over the cover 100b, and is reflected on or absorbed in the palm. The image sensor 120 takes an image of the palm that is held over the cover 100b through lenses of the lens unit 3.

The image sensor 120 is a multi-polarization image sensor in which one pixel is structured, for example, by each of four image sensors having a polarizing plate that differs from others in a polarization direction. In the following, a pixel structuring method in the image sensor 120 is explained. Multi-polarization image sensors are structured based on the same idea as color image sensors, and are structured by replacing color filters in color image sensors with polarizing plates.

Figure 3A:
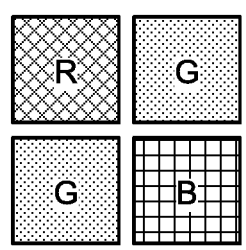
FIG. 3A is a diagram illustrating one example of a structure of a color image sensor.

FIG. 3A is a diagram illustrating one example of a structure of a color image sensor. For example, as illustrated in FIG. 3A, color image sensors corresponding to respective three primary colors of R (Red), G (Green), B (Blue) are arranged in the Bayer array. The arrangement pattern illustrated in FIG. 3A is repeated in a sensor area of the color image sensor.

Figure 3B:
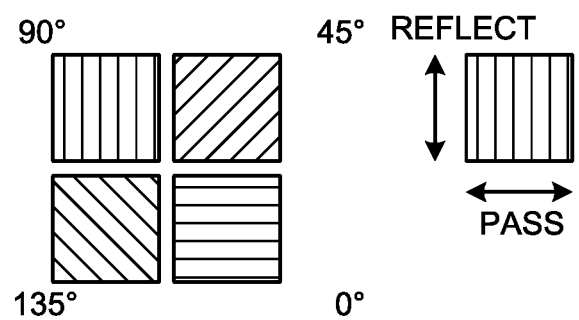
FIG. 3B is a diagram illustrating one example of a structure of a multi-polarization image sensor in the imaging device according to the first embodiment.

FIG. 3B is a diagram illustrating one example of a structure of the multi-polarization image sensor in the imaging device according to the first embodiment. In the first embodiment, the multi-polarization image sensor is structured based on the method of structuring the color image sensor illustrated in FIG. 3A. The pixel of B illustrated in FIG. 3A is replaced with a pixel in which a polarizing plate with a lattice direction of 0° is arranged. Similarly, the pixel of G on the upper right side illustrated in FIG. 3A is replaced with a pixel in which a polarizing plate with a lattice direction of 45° is arranged. Similarly, the pixel of R in FIG. 3A is replaced with a pixel in which a polarizing plate of a lattice direction of 90° is arranged. Similarly, the pixel of G on the lower left side illustrated in FIG. 3A is replaced with a pixel in which a polarizing plate of a lattice direction of 135° is arranged.

In this example, a wire-gird polarizing plate is assumed to be used, and as for a transmittance direction and a reflection direction of the respective polarizing plates, as illustrated in FIG. 3B, it passes when the polarization direction is perpendicular to the lattice direction, and it reflects when the polarization direction matches with the lattice direction. As the polarization directions of transmittance and reflection are determined according to the direction of lattice, in this specification, a term, polarization direction of a polarizing plate is also used instead of a term, direction of lattice. Moreover, in principle, absorbing polarizing plates can also be applied, and in that case, reflection in the above description is replaced with absorption.

Thus, as illustrated in FIG. 3B, polarizing plates having different polarization directions are arranged for respective four pixels, and this arrangement is repeated in the entire sensor area similarly to the color image sensor, thereby structuring the multi-polarization image sensor.

Figure 4:
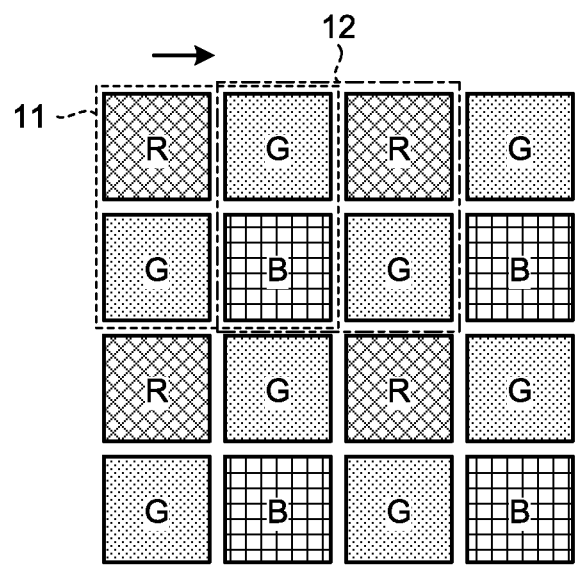
FIG. 4 is a diagram illustrating one example of a pixel structuring method of the color image sensor.

FIG. 4 is a diagram illustrating one example of a pixel structuring method of the color image sensor. In the color image sensor, one pixel is expressed with four pixels having different characteristics. As illustrated in FIG. 4, in a broken-line-surrounded section 11, one piece each of R and B, and two pieces of G are included, and this is considered to structure one pixel. An output of G is a mean value of outputs of two pieces of G. Next, a broken-line-surrounded section 12 shifted rightward by one column is considered as a next pixel to the right. The broken-line-surrounded section 12 shares one piece of G and B with the broken-line-surrounded section 11, but uses different pieces for the other G and R. As described, pixels in a horizontal direction in FIG. 4 are structured. Similarly, pixels in a vertical direction in FIG. 4 are structured.

Figure 5A:
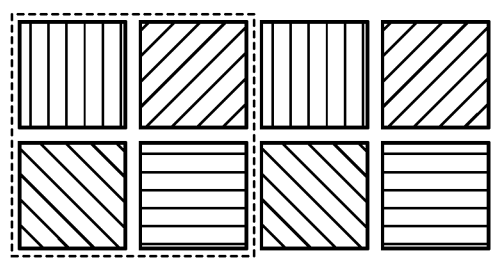
FIG. 5A is a diagram illustrating one example of a pixel structuring method of the multi-polarization image sensor of the imaging device according to the first embodiment.
Figure 5B:
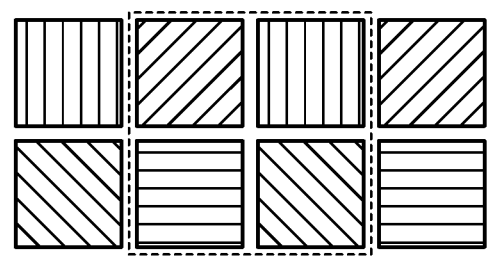
FIG. 5B is a diagram illustrating one example of the multi-polarization image sensor of the imaging device according to the first embodiment.

The multi-polarization image sensor also structures pixels similarly to the color image sensor. FIGS. 5A and 5B are diagrams illustrating one example of a pixel structuring method of the multi-polarization image sensor of the imaging device according to the first embodiment. As illustrated in a broken-line box in FIG. 5A, one pixel is structured with four polarization directions of 0°, 45°, 90°, and 135°. A next pixel to the right is structured as in a broken-line box shifted rightward by one column as illustrated in FIG. 5B. In both a horizontal direction and a vertical direction, by shifting the pixel structure by one, an image having polarization characteristics of four directions can be acquired while maintaining the number of output pixels, similarly to the color image sensor.

Figure 6A:
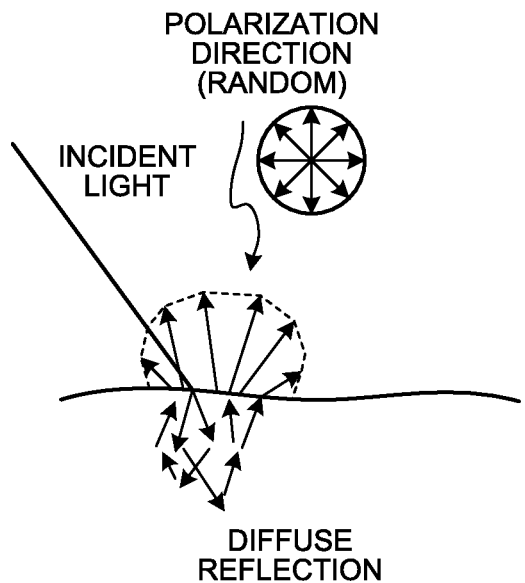
FIG. 6A is a diagram illustrating one example of an act of reflected light from an object to be imaged in the imaging device according to the first embodiment.
Figure 6B:
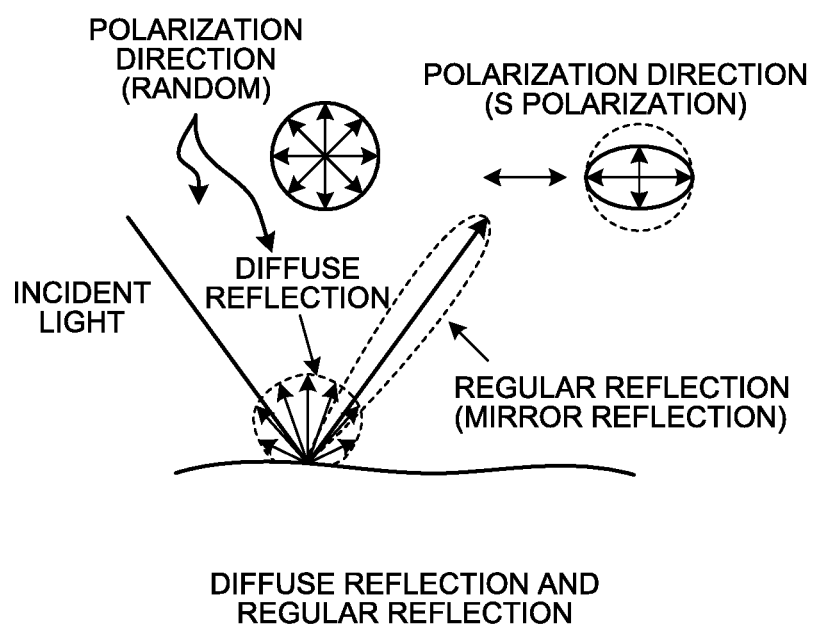
FIG. 6B is a diagram illustrating one example of an act of reflected light from an object to be imaged in the imaging device according to the first embodiment.

To explain functions and effects of the first embodiment, an act of reflected light from an object to be imaged is first explained. FIG. 6A and FIG. 6B are diagrams illustrating one example of an act of reflected light from an object to be imaged in the imaging device according to the first embodiment. In a palm image when illuminated with external light, a dynamic range of brightness increases by a local high-brightness region, and there are disadvantageous influences, such as decrease in an entire signal level, and disappearance of a minute signal covered by a local high-brightness region, to palm authentication. Occurrence of a local high-brightness region is caused mainly by regular reflection of illumination light from a palm surface appearing in an image. Moreover, while external light has random polarization, components of light that is regular-reflected on an object surface are biased such that S-polarization component is intense.

As illustrated in FIG. 6A, incident light to an object is not just reflected on a surface of the object, but is also reflected such a manner that it enters the inside of the object, repeats diffusion and reflection, and then comes out of the surface. Light that has entered to the inside is diffused inside a skin tissue of a person, and repeats diffusion and reflection to be emitted from a surface, and it has little directivity and isotropically diffuses as illustrated in FIG. 6A.

Furthermore, as illustrated in FIG. 6B, even with minute unevenness on a surface of an object, diffuse reflection in which light is reflected in various directions occurs. The diffuse reflection repeats reflection, and the polarization direction is thus disordered, and even if incident light is linearly polarized, diffuse-reflected light becomes random. In addition to the diffuse reflection, a part of light is regular-reflected (mirror reflection) on a surface of an object. Unlike the diffuse reflection, the regular reflection has a strong directivity to a direction of mirror reflection.

Moreover, the regular reflection also has distinctive polarization characteristics. The reflectivity of light on an object surface differs depending on a polarization direction, and P-polarized light in which an electric field vibrates in a plane of incidence is likely to pass through a boundary, and has low reflectivity. On the other hand, the vibration of an electric field is perpendicular to a plane of incidence, that is to say that S polarization light parallel to a boundary has high reflectivity. Therefore, even if incident light is randomly polarized, regular reflection light is to be light having strong S polarization component. This phenomenon, that is, the regular reflection and a change of a polarization direction on an object surface, is illustrated in a perspective view in FIG. 7.

Figure 7:
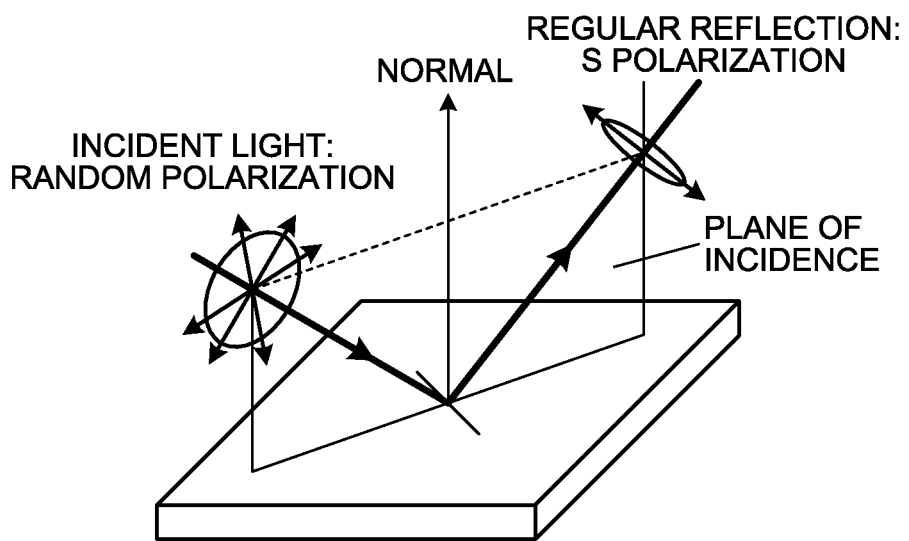
FIG. 7 is a perspective view illustrating regular reflection and changes in a polarization direction on an object surface.
Figure 8:
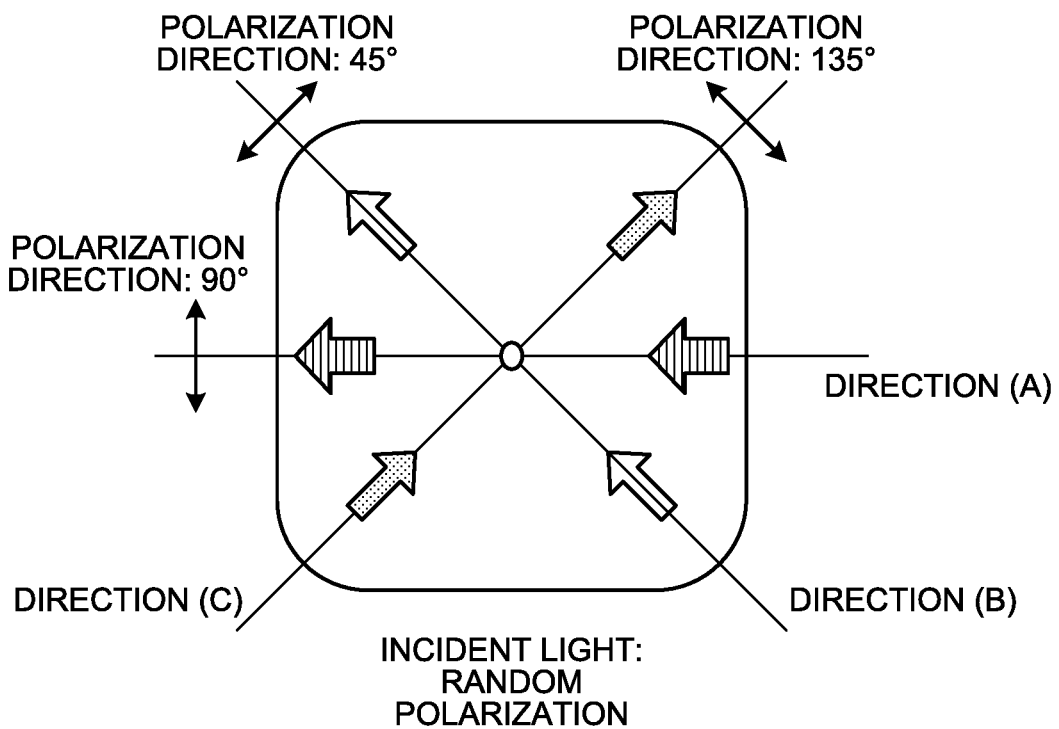
FIG. 8 is a schematic diagram illustrating a relationship between regular reflection and a polarization direction from a direction of the normal of an object surface.

As illustrated in FIG. 7, the polarization direction of regular reflection has strong S polarization in which an electric field vibrates in a direction perpendicular to a plane of incidence that is determined by the normal of an object surface and a direction of incident light. FIG. 8 is a schematic diagram illustrating a relationship between regular reflection and a polarization direction with a plan view from a direction of the normal of an object surface. As described above, the polarization direction of light that is regular-reflected on an object surface is mostly the S polarization, that is, a direction perpendicular to a plane of incidence. Therefore, when illumination light of random polarization enters from a direction of (A) in FIG. 8, the polarization direction of light that is regular-reflected on the object surface is mostly 90°. Similarly, the regular reflection of illumination light entering from a direction (B) is mostly 45°, and the regular reflection of illumination light entering from a direction (C) is mostly 135°.

Even when an incident direction of illumination varies, if a polarizing plate to shield the S polarization light with respect to the direction can be always applied, regular reflection light can be significantly reduced even with illumination light of random polarization, such as sun light.

In the first embodiment, a function of reducing this regular reflection light to the sufficiently practical level is achieved by using properties that the adjacent four pixels of the multi-polarization image sensor pass polarization light of respective different directions. Thus, even when illumination by external light that has random polarization and, the incident direction of which cannot be controlled is used, an effect of acquiring an excellent palm image without a local high-brightness region can be expected.

Figure 9:
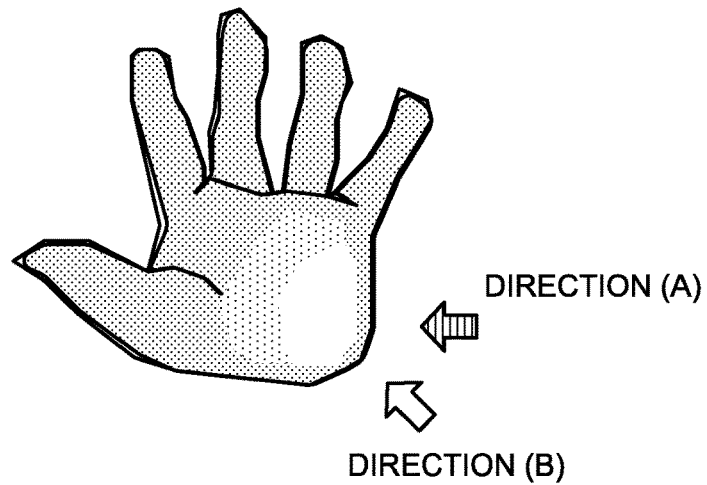
FIG. 9 is a diagram illustrating a palm when illuminating with intense external light.

FIG. 9 illustrates a palm when illuminating with intense external light, such as sun light, and illustrates light that is imaged on a sensor surface of the image sensor 120 by the lens unit 3 in this example. That is, a palm image in FIG. 9 is an input signal to the image sensor 120, and this light is subjected to intensity modulation by the polarizing plates of the multi-polarization image sensor, and is converted into an image signal of the image sensor 120.

For example, when illumination light of external light enters from a direction (B) in FIG. 9 to the palm and a local high-brightness region is generated at a lower right part of the palm image, out of the four different polarization directions of the multi-polarization image sensor, the polarizing plate of the direction of 135° passes regular reflection light the most, and the brightness of the pixel becomes high. Those of the directions of 0° and 90° are the second highest, and the brightness of the pixel of the direction of 45° is the lowest. Furthermore, when the illumination of external light that forms the local high-brightness region at the lower right part enters from a direction of (A) in FIG. 9, out of the four different polarization directions of the multi-polarization image sensor, the polarizing plate of the direction of 90° reflects regular reflection light the most not to let it pass. That is, the intensity of light that has passed through the polarizing plate of the direction of 90° is the lowest, and is considered as substantially diffuse reflection light.

As described, by choosing entire pixels following a rule to use a pixel of the lowest brightness per group of four pixels, an excellent palm image in which regular reflection light is removed can be acquired.

Explanation is returned to FIG. 1, FIG. 2A, FIG. 2B. The light emitting device 130 is a light source, such as an LED (light emitting diode), that emits random polarization light to irradiate a palm, which is an object to be imaged, held over the imaging device 100. Hereinafter, the light emitting device 130 can be referred to as self-illumination. On the other hand, ambient light such as sunlight and room light can be referred to as external illumination. Moreover, the self-illumination light and external illumination light can be referred to as illumination light, collectively.

The control unit 110 includes a lighting control unit 110a, an image acquiring unit 110b, a pixel selecting unit 110c, and an image output unit 110d. The lighting control unit 110a controls lighting on and off of the light emitting device 130.

The image acquiring unit 110b instructs the lighting control unit 110a to turn off the light emitting device 130. The image acquiring unit 110b then acquires an image by causing the image sensor 120 to capture an image (hereinafter, external light image in some cases) including a palm held over the imaging device 100 and a background in a state in which the light emitting device 130 is turned off. The external light is light other than light by the self-illumination, such as outdoor natural light or indoor room illumination light.

Furthermore, the image acquiring unit 110b instructs the lighting control unit 110a to turn on the light emitting device 130. The image acquiring unit 110b then acquires an image by causing the image sensor 120 to capture an image (hereinafter, self-illumination image in some cases) including a palm held over the imaging device 100 and a background in a state in which the light emitting device 130 is turned on.

Subsequently, the image acquiring unit 110b acquires a difference image between the external light image and the self-illumination image.

The image acquiring unit 110b determines whether the brightness of a predetermined portion (for example, a central portion of the image) of the external light image is equal to or higher than a first threshold, or whether the brightness of a predetermined portion (for example, a central portion of the image) of the difference image between the external light image and the self-illumination image is lower than a second threshold. The image acquiring unit 110b uses the external image as an image subject of processing of pixel selection when the brightness of the predetermined portion of the external image is equal to or higher than the first threshold, or when the brightness of the predetermined portion of the difference image between the external image and the self-illumination image is lower than the second threshold.

On the other hand, the image acquiring unit 110b uses the difference image as an image subject of processing of pixel selection when the brightness of the predetermined portion of the external image is lower than the first threshold and the brightness of the predetermined portion of the difference image between the external image and the self-illumination image is equal to or higher than the second threshold. The image acquiring unit 110b uses the external light image as an image subject of processing of pixel selection even if the brightness of the predetermined portion of the external image is lower than the first threshold, if the brightness of the predetermined portion of the difference image between the external light image and the self-illumination image is lower than the second threshold.

The pixel selecting unit 110c selects a pixel, the brightness of which is the lowest per pixel group that is constituted of adjacent four pixels as one group, throughout the whole image subject of processing. The adjacent four pixels are four pieces of pixels that are arranged in a lattice-like structure. The image output unit 110d generates one palm image by connecting pixels selected by the pixel selecting unit 110c.

(Brightness Distribution of Image Including Regular Reflection)

Figure 10:
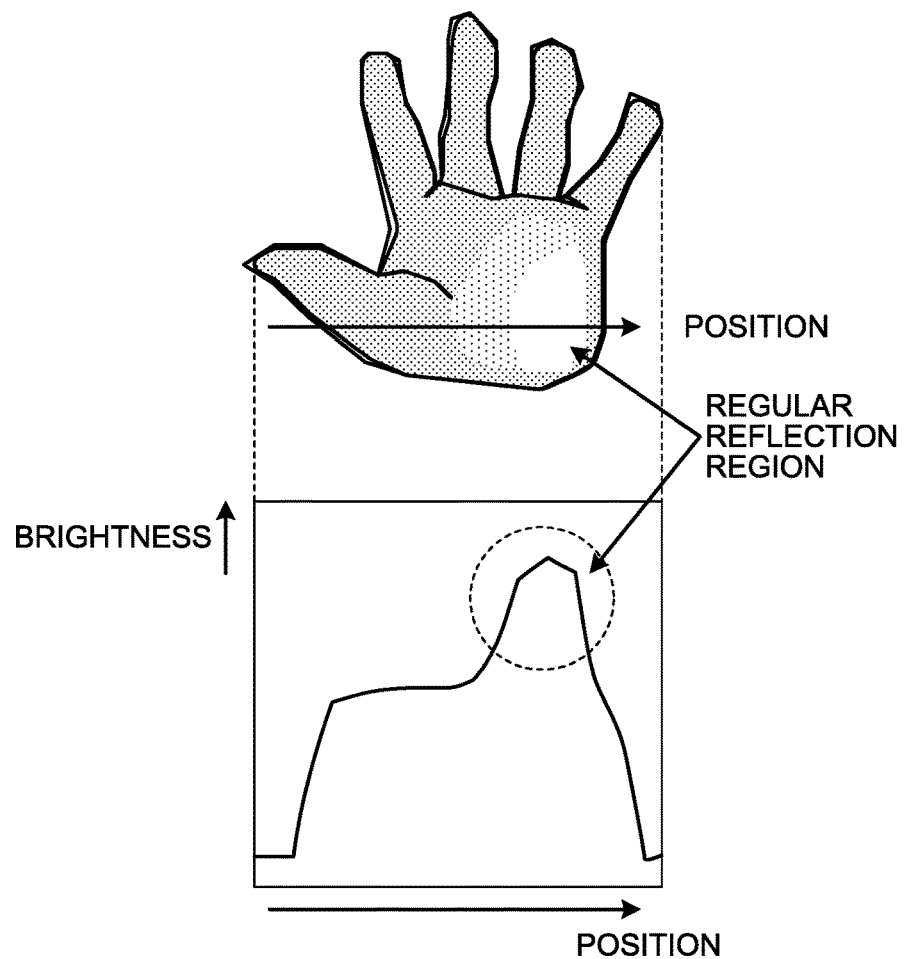
FIG. 10 is a diagram illustrating one example of a brightness distribution of an image including regular reflection out of reflected light from an imaging object in the imaging device according to the first embodiment.

FIG. 10 is a diagram illustrating one example of a brightness distribution of an image including regular reflection out of reflection light from an imaging object in the imaging device according to the first embodiment. A regular reflection region at a lower right portion in a figure expressing a palm appears in a brightness distribution graph illustrated at a lower part of FIG. 10 as a locally high brightness.

As illustrated in FIG. 10, the brightness distribution of the entire palm image is that a local high brightness caused by regular reflection light entering through the lenses is superimposed on the brightness distribution of a signal image that is generated by diffuse reflection light. Therefore, by avoiding the regular reflection, continuous images by the diffuse reflection light can be acquired. By using the smallest value out of brightness outputs of the four polarization directions, the regular reflection light by the random polarization illumination can be significantly removed, and inconvenience due to biased brightness distribution in one image can be reduced, and the continuity of pixels in image data can be expected enough.

(Switch from Self-Illumination to External Illumination According to First Embodiment)

Figure 11A:
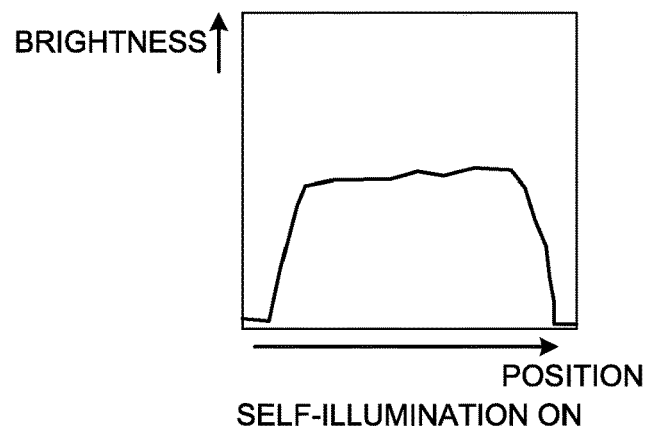
FIG. 11A is a diagram illustrating one example of a brightness distribution of an image in the imaging device according to the first embodiment when a self-illuminating device is on under intense external light.
Figure 11B:
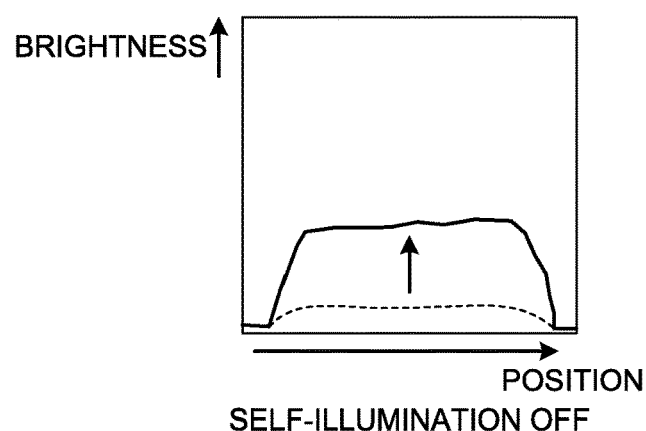
FIG. 11B is a diagram illustrating one example of a brightness distribution of an image in the imaging device according to the first embodiment when the self-illuminating device is off under intense external light.
Figure 11C:
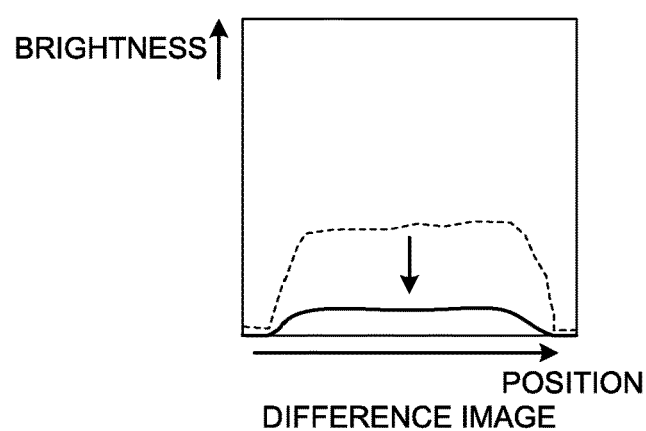
FIG. 11C is a diagram illustrating one example of a brightness distribution of a difference image in the imaging device according to the first embodiment when the self-illuminating device is on and off under intense external light.

FIG. 11A is a diagram illustrating one example of a brightness distribution of an image in the imaging device according to the first embodiment when the self-illuminating device is on under intense external light. FIG. 11B is a diagram illustrating one example of a brightness distribution of an image in the imaging device according to the first embodiment when the self-illuminating device is off under intense external light. FIG. 11C is a diagram illustrating one example of a brightness distribution of a difference image in the imaging device according to the first embodiment when the self-illuminating device is on and off under intense external light. Switch from the self-illumination to the external illumination according to the first embodiment is explained, referring to FIG. 11A to FIG. 11C.

When the intensity of the external light is not high like that of indoors, the brightness of an image when the self-illumination is OFF is low as expressed by a broken line in FIG. 11B, and therefore, the difference image between the external light image and the self-illumination image is to be an image with sufficient difference in brightness as expressed by a broken line in FIG. 11C. However, in an environment with intense external light, the difference image between the external light image and the self-illumination image is to be an image in which the brightness of an image when the self-illumination is OFF is high as expressed by a solid line in FIG. 11B, and that has insufficient difference in brightness as expressed by a solid line in FIG. 11C.

Specifically, when the intensity of the external light becomes high, the brightness is to be high in both of the case in which the self-illumination is ON illustrated in FIG. 11A and the case in which the self-illumination is OFF illustrated in FIG. 11B, and exposure time is therefore shortened so as not to saturate the brightness. Accordingly, a brightness difference in the difference image between the external light image and the self-illumination image becomes small. As described, when the brightness difference is small, an influence of light noise or circuit noise increases, and a disadvantageous influence occurs in image processing for extraction of a vein pattern of a palm.

Therefore, in the first embodiment, a method is switched, by threshold determination, from a method of acquiring a palm vein pattern by a difference image to a method of acquiring a palm vein pattern only by the external light image. Specifically, in the first embodiment, when the brightness of, for example, a central portion of the external light image illustrated in FIG. 11B becomes equal to or higher than the first threshold, the method is switched from the method of acquiring a palm vein pattern by a difference image to the method of acquiring a palm vein pattern only by the external light image. Moreover, in the first embodiment, when the brightness of the difference image illustrated in FIG. 11C becomes lower than the second threshold, the method is switched from the method of acquiring a palm vein pattern by a difference image to the method of acquiring a palm vein pattern only by the external light image.

That is, in the first embodiment, a palm is imaged by the self-illumination indoors, or the like when the intensity of the external light is lower than predetermined intensity. As the intensity of the external light increases due to usage at a window or outside, appropriate exposure time to acquire a difference image between those when the self-illumination is ON and OFF becomes short. Therefore, in the first embodiment, the method is switched from the method of acquiring a palm vein pattern by a difference image to the method of acquiring a palm vein pattern only by the external light image with respect to a predetermined condition.

(Imaging Processing in Imaging Device According to First Embodiment)

Figure 12:
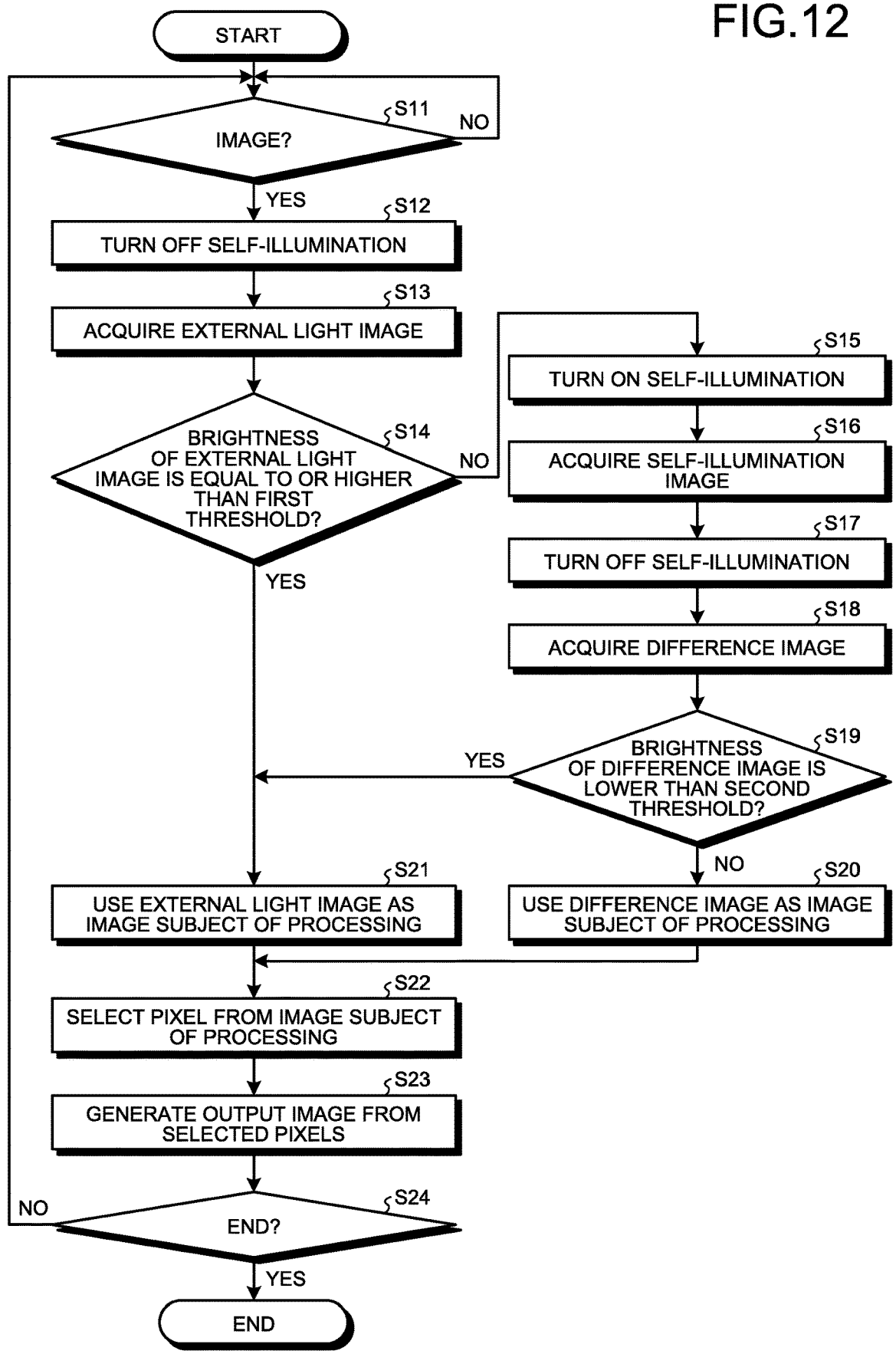
FIG. 12 is a flowchart illustrating one example of imaging processing in the imaging device according to the first embodiment.

FIG. 12 is a flowchart illustrating one example of imaging processing in the imaging device according to the first embodiment. As illustrated in FIG. 12, the imaging device 100 first determines whether to image a palm (step S11). When the imaging device 100 images a palm (step S11: YES), the processing proceeds to step S12. On the other hand, when the imaging device 100 does not image a palm (step S11: NO), step S11 is repeated.

At step S12, the imaging device 100 turns off the self-illumination. Subsequently, the imaging device 100 acquires an external light image of the palm (step S13). Subsequently, the imaging device 100 determines whether the brightness of the external image (for example, at a predetermined portion) is equal to or higher than the first threshold (step S14). When the brightness of the external light image (at a predetermined portion) is equal to or higher than the first threshold (step S14: YES), the imaging device 100 shifts the processing to step S21. On the other hand, when the brightness of the external light image (at a predetermined portion) is lower than the first threshold (step S14: NO), the imaging device 100 shifts the processing to step S15.

At step S15, the imaging device 100 turns ON the self-illumination. Subsequently, the imaging device 100 acquires a self-illumination image (step S16). Subsequently, the imaging device 100 turns OFF the self-illumination (step S17). Subsequently, the imaging device acquires a difference image between the external light image acquired at step S13 and the self-illumination image acquired at step S16 (step S18).

Subsequently, the imaging device 100 determines whether the brightness of the difference image (for example, at a predetermined portion) is lower than the second threshold (step S19). When the brightness of the difference image (for example, at a predetermined portion) is lower than the second threshold (step S19: YES), the imaging device 100 shifts the processing to step S21. On the other hand, when the brightness of the difference image (for example, at a predetermined portion) is equal to or higher than the second threshold (step S19: NO), the imaging device 100 shifts the processing to step S20.

At step S20, the imaging device 100 uses the difference image as an image subject of processing. On the other hand, at step S21, the imaging device 100 uses the external light image as an image subject of processing. When step S20 or step S21 is completed, the imaging device 100 shifts the processing to step S22.

At step S22, the imaging device 100 selects a pixel having the lowest brightness per pixel group from the image subject of processing. The imaging device 100 then generates an output image from pixels selected at step S22 (step S23). Subsequently, the imaging device 100 determines whether to end the imaging processing (step S24). When determining to end the imaging processing (step S24: YES), the imaging device 100 ends the imaging processing, and when determining not to end the imaging processing (step S24: NO), the processing is shifted to step S11.

At step S19, when the brightness of the difference image (for example, at a predetermined portion) is lower than the second threshold (step S19: YES), the imaging device 100 can skip performing the processing at step S21 to step S24, and can shift the processing to step S11. Alternatively, the determination can be performed only based on the first threshold at step S14, and the processing at step S19 can be omitted.

Alternatively, upon acquiring either of the "external light image" or the "self-illumination image", the processing of image selection and generation of an output image at step S22 to step S23 can be performed for the acquired image, and the other image acquisition can be omitted.

Alternatively, turning OFF of the self-illumination at step S12 and turning ON of the self-illumination at step S15 can be switched, and acquisition of an external light image at step S13 and acquisition of a self-illumination image at step S16 can be switched. That is, a "first image" and a "second image" can be the "external light image" and the "self-illumination image", respectively, or can be the "self-illumination image" and the "external light image", respectively.

In the first embodiment, while using external light for illumination, an excellent palm image in which a local high-brightness region, such as glare, is removed can be acquired.

Although the control unit 110 of the imaging device 100 performs the various kinds of processing illustrated in the flowchart of FIG. 12 in the first embodiment, it is not limited thereto, and by connecting the imaging device 100 and an external control device (not illustrated), the external control device can control the imaging device 100 to perform the various kinds of processing.

Second Embodiment

Figure 13:
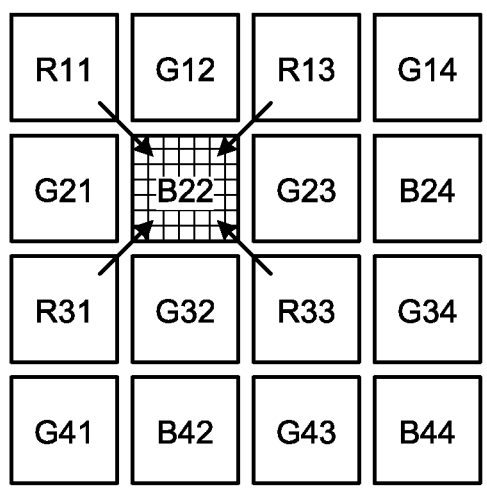
FIG. 13 is a diagram illustrating another example of a method of structuring the color image sensor.

In a second embodiment, the pixel structuring method is based on another pixel structuring method, unlike the first embodiment based on the pixel structuring method of the color image sensor illustrated in FIG. 4. FIG. 13 is a diagram illustrating another example of a method of structuring the color image sensor. Although only an output signal of B is available for a pixel corresponding to B22 in FIG. 13, a mean value of four pixels of adjacent R11, R13, R31, and R33 is calculated as R22, and a mean value of four pixels of G12, G23, G32, and G21 is calculated as G22, to obtain output signals of R, G, B of the pixel corresponding to B22. Furthermore, although only an output signal of G is available for a pixel corresponding to G23 in FIG. 13, a mean value of two pixels of adjacent R13 and R33 is calculated as R23, and a mean value of two pixels of B22 and B24 is calculated as G23, to obtain output signals of R, G, B corresponding to G23.

In the second embodiment, pixels of the multi-polarization image sensor are structured in a similar manner as in the pixel structuring method of the color image sensor. That is, the method of replacing respective color filters of R, G, B in the Bayer arrangement with respective polarizing plates of 0°, 45°, 90°, and 135° is the same as the first embodiment. Moreover, other points are also the same as the first embodiment.

Pixels can be structured by using various publicly-known pixel structuring methods other than that of the first and the second embodiments according to a demanded image quality.

The respective components illustrated in the first to the second embodiment can be modified or omitted within a range not departing from the technical scope of the imaging device according to the disclosed technique. Furthermore, the first to the second embodiments are merely one example, and not only the modes described in the section of disclosure of the invention, but also other modes in which various modifications and improvements are made based on knowledge of a person skilled in the art are also included in the disclosed technique.

According to one example of the disclosed technique, for example, accurate extraction of a vein pattern is enabled.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An imaging device comprising:
an image sensor that images an object to be imaged through polarizing plates arranged to have a different polarization direction for each pixel in a pixel group that includes a plurality of pixels corresponding to each point of the object to be imaged;
a microcomputer that selects a pixel having a lowest brightness for each of the pixel group corresponding to each of the points
to output a captured image of the object to be imaged that is generated from the selected pixels; and
a light emitting device that emits illumination light having random polarization to irradiate the object to be imaged, wherein
the microcomputer:
controls on and off states of the light emitting device;
acquires a first image and a difference image from the image sensor, the first image captured by imaging the object to be imaged by the image sensor in a state in which the light emitting device is controlled to be off, the difference image between the first image and a second image captured by imaging the object to be imaged by the image sensor in a state in which the light emitting device is controlled to be on; and
selects a pixel having a lowest brightness for each pixel group corresponding to each point of either the first image or the difference image according to a brightness of any one of the first image and the difference image.

2. The imaging device according to claim 1, wherein the microcomputer:
cancels acquisition of the second image and the difference image when the brightness of the first image is equal to or higher than a first threshold, and
selects a pixel having a lowest brightness for each pixel group corresponding to each point of the first image.

3. The imaging device according to claim 1, wherein the microcomputer:
acquires the second image and the difference image when the brightness of the first image is lower than a first threshold, and
selects a pixel having a lowest brightness for each pixel group corresponding to each point of the difference image when the brightness of the difference image is equal to or higher than a second threshold, and selects a pixel having a lowest brightness for each pixel group corresponding to each point of the first image when the brightness of the difference image is lower than the second threshold.

4. An imaging method comprising:
imaging an object to be imaged through polarizing plates arranged to have a different polarization direction for each pixel in a pixel group that includes a plurality of pixels corresponding to each point of the object to be imaged;
selecting a pixel having a lowest brightness for each of the pixel group corresponding to each of the points;
outputting a captured image of the object to be imaged that is generated from the selected pixels;
emitting illumination light having random polarization to irradiate the object to be imaged;
controlling on and off states of the illumination light; and
acquiring a first image and a difference image, the first image captured by imaging the object to be imaged in a state in which the illumination light is controlled to be off, the difference image between the first image and a second image captured by imaging the object to be imaged in a state in which the illumination light is controlled to be on, wherein
the selecting includes selecting a pixel having a lowest brightness for each pixel group corresponding to each point of either the first image or the difference image according to a brightness of any one of the first image and the difference image.

* * * * *